3,518,294
AROMATIC DICARBOXYLIC ACIDS HAVING
TWO SULFONATE LINKAGES
Burton M. Rein, Piscataway, N.J., assignor to Mobil Oil
Corporation, a corporation of New York
No Drawing. Filed Mar. 9, 1967, Ser. No. 621,774
Int. Cl. C07c 143/68; C08g 33/14
U.S. Cl. 260—456        2 Claims

ABSTRACT OF THE DISCLOSURE

Aromatic dicarboxylic acids having three or more phenylene groups and two sulfonate linkages. They are prepared by oxidation of (A) bis-toluenesulfonate ester of a bis-phenol or (B) m-benzenedisulfonate of a cresol. These dicarboxylic acids are polymerizable with glycol to produce thermally stable polyesters.

BACKGROUND OF THE INVENTION

Field of the invention

This invention relates to aromatic dicarboxylic acids. It is more particularly concerned with novel aromatic dicarboxylic acids having three or more phenylene groups and two sulfonate linkages.

Description of the prior art

Polyesters having good fiber forming properties have been prepared by reacting aromatic dicarboxylic acids such as terephthalic acid with a glycol. Frequently, if the acid contains more than one phenylene group the polyester will have greater thermal stability.

Aromatic dicarboxylic acids have been prepared by oxidizing methyl substituted aromatic compounds with molecular oxygen-containing gas (e.g., U.S. Pats. Nos. 2,245,528 and 3,036,122). When, however, a plurality of phenylene groups have been linked with groups such as sulfite, carbonate, and oxalate, with methyl groups on the terminal phenyls, they do not undergo such oxidation. Thus, the desideratum is a stable linking group that will permit oxidation to the dicarboxylic acid.

SUMMARY OF THE INVENTION

It is the discovery of this invention that a plurality of phenylene groups linked with sulfonate groups and having methyl groups on the terminal phenyls can be readily oxidized with an oxygen-containing gas.

Accordingly, this invention provides aromatic dicarboxylic acids having the structural formulae:

(A) 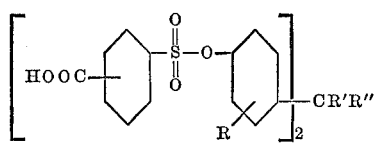

and (B) 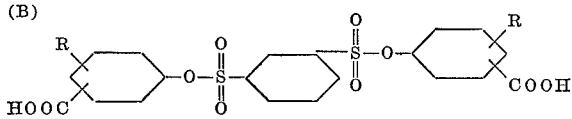

wherein R is hydrogen, t-butyl, halogen, nitro, or alkoxy and R' and R" are alkyl ($C_1$–$C_3$).

DESCRIPTION OF SPECIFIC EMBODIMENTS

The compounds of this invention are aromatic dicarboxylic acids having at least three phenylene groups with sulfonate linkages, having the formulae defined in the Summary of the Invention. Each type is produced by oxidation of the corresponding methyl derivative with molecular oxygen-containing gas.

PRECURSORS FOR OXIDATION

In the case of preparing compounds of Formula A, a bis-phenol is esterified with a toluenesulfonyl halide to form the methyl derivative to be oxidized, i.e., the compound of Formula A having methyl groups instead of the carboxyl groups. The bis-phenol reactants having the formula:

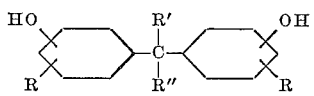

wherein R' and R" are alkyl ($C_1$–$C_3$) and R is hydrogen, t-butyl, halogen, nitro, or alkoxy and R and OH can occupy any, but dissimilar, ortho, meta or para position. Non-limiting examples of the bis-phenol reactants are 2,2-bis(m-hydroxyphenyl) butane; 2,2 - bis(p - hydroxyphenyl) - 4 - methylpentane; 2,2-bis(m-hydroxyphenyl)-n-heptane; 2,2-bis(4-hydroxy - 3 - tertiarybutyl)-propane; 2,2-bis(4-hydroxy-3-chlorophenyl) propane; 2,2-bis(4-hydroxy - 5 - nitrophenyl) propane; 2,2-bis(4-hydroxy-3 - methoxyphenyl) propane; and 2,2 - bis(p - hydroxyphenyl) propane (Bisphenol A).

The toluenesulfonyl halides are preferably the chlorides, although bromides and iodides can be used. Typical reactants are p-toluenesulfonyl chloride, o-toluenesulfonyl chloride, o-toluenesulfonyl bromide and p-toluenesulfonyl iodide.

The reaction between the bis-phenol reactant and the toluenesulfonyl halide reactant can be carried out by any of the methods well known in the art. As hydrogen halide is produced in the reaction, a base, such as caustic or a tertiary amine, is used to remove hydrogen and drive the reaction toward completion. Thus, the bis-phenol reactant can be dissolved in aqueous sodium hydroxide and reacted with the toluenesulfonyl halide. A particularly feasible method, employing pyridine, is described by Tipson, J. Org. Chem., 9, 235 (1944). Preferably, the reaction is carried out at about room temperature or lower.

In the case of preparing compounds of Formula B, a cresol reactant is esterified with m-benzenedisulfonyl halide, preferably the chloride, to form the methyl derivative to be oxidized, i.e., the compound of Formula B with methyl groups instead of carboxyl groups.

The cresol reactant contemplated herein is a compound having the formula:

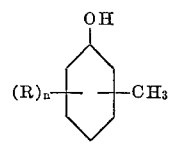

wherein R can be tertiary-alkyl, methyl, nitro, cyano, halogen, alkoxy, or sulfo (or salt), $n$ is 0 to 1, and R and —$CH_3$ can occupy any, but dissimilar, ortho, meta, or para position. Typical cresol reactants o-cresol, m-cresol, p-cresol, 4-chloro-m-cresol, 2-nitro-p-cresol, 2-methoxy-p-cresol, 4 - nitro-m-cresol, 3 - tertiary-butyl-m-cresol, 2-bromo-p-cresol, 3,4-dimethylphenol, and 3-sulfo-p-cresol.

The esterification is carried out as described hereinbefore, suitably using the method of Tipson, supra.

OXIDATION TO DICARBOXYLIC ACID

The solvent used in the process of this invention is a lower ($C_2$–$C_4$) fatty acid, i.e., acetic acid, propionic acid, or butyric acid; or a mixture of two or more lower fatty acids. In general, the concentration of cresylic arylsulfonate reactant will be between about 2 percent and about 20 percent, by weight of the lower fatty acid and preferably between about 7 percent and about 12 percent.

The oxidation reaction is effectively catalyzed by a cobalt salt of a lower ($C_2$–$C_4$) fatty acid, i.e. cobalt acetate, propionate, or butyrate. Between about 0.1 percent and about 5 percent, based on the weight of fatty acid, is generally sufficient.

The promoter, or reaction activator, used in the present oxidation process is a methylenic ketone, such as methyl ethyl ketone, methyl n-propyl ketone, diethyl ketone, 2,4-pentanedione, and 2,5-hexanedione. The concentration of the promoter should be between about 0.5 percent and about 10 percent, by weight of the lower fatty acid.

The oxidation is effected by contacting the reaction mixture with molecular oxygen containing gas at an oxygen partial pressure of between about 100 and about 1000 p.s.i.g. While air or other oxygen-containing gas can be used, relatively pure oxygen is preferred. Generally, the oxidation reaction is carried out at a temperature of between about 125° C. and about 145° C., preferably at about 130° C.

EXAMPLE 1

A 300 ml. autoclave was charged with mixture of MEK (5.0 g., 0.70 mole), cobalt acetate tetrahydrate (2.5 g., 0.01 mole) and acetic acid (100 ml.). The solution was stirred rapidly and maintained at temperature of about 125° C. while pure oxygen was passed in at a rate so as to sustain the pressure at 250 p.s.i. An exothermic reaction proceeded and after 100 p.s.i., oxygen was consumed, the mixture was cooled. 4,4'-isopropylidene-diphenyl 4'',4'''-di-toluenesulfonate (10 g., 0.0187 mole), MEK (2.5 g., 0.35 mole) and acetic acid (25 ml.) was then added and the reaction was continued at about 125° C. and 250 p.s.i. until the oxygen absorption ceased. The product, a white ppt. was filtered, washed with acetic acid, cold water and dried in an oven at 109° C. The yield of crude 4,4' isopropylidene-di-phenyl 4'',4'''-di carboxybenzenesulfonate was 9.4 g. (84% the theoretical) M.P. 271–4° C.

Neutralization equivalent:
 Calc. _____ 298
 Found _____ 301

The dibasic acid was converted to its corresponding dimethyl ester (M.P. 104–7° C.), by treatment with a 10% $BF_3$—MeOH solution. The N.M.R. spectrum of the di-methyl ester was consistent with the proposed structure (I).

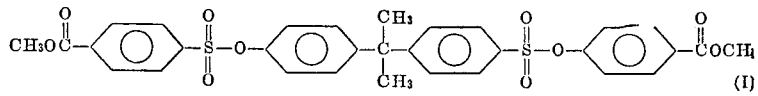

The products of the process of this invention are novel arylcarboxylic acids having the formulae:

(A)

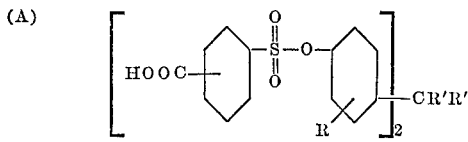

and (B)

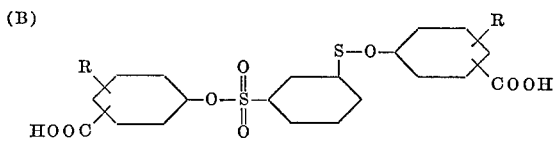

wherein R, R', and R'' are as defined hereinbefore in the Summary of the Invention. Typical arylcarboxylic acids of this invention are:

4,4'-isopropylidene-diphenyl-4'',4'''-dicarboxybenzenesulfonate;
4,4'-isobutylidene-di(3,3'-chlorophenyl)-4'',4'''-dicarboxybenzenesulfonate;
4,4'-isohexylidene-diphenyl-4'',4'''-dicarboxybenzenesulfonate;
4,4'-isopropylidene-di(2,2'-t-butylphenyl)-4'',4'''-dicarboxybenzenesulfonate;
4,4'-isopropylidene-di(3,3'-nitrophenyl)3'',3'''-dicarboxybenzenesulfonate;
4,4'-isopropylidene-di(3,3'-methoxyphenyl)-2'',2'''-dicarboxybenzenesulfonate;
di(4-carboxyphenyl)-1',3'-benzene-di-sulfonate;
di(3-carboxyphenyl)-1',3'-benzene-disulfate;
di(2-carboxyphenyl)-1',3'-benzene-di-sulfonate;
di(3-carboxyphenyl)-1',3'-benzene-disulfonate;
di(2-t-butyl-4-carboxyphenyl)-1',3'-benzene-disulfonate;
di(3-carboxy-4-nitrophenyl)-1',3'-benzene-di-sulfonate;
di(2-butoxy-4-carboxyphenyl)-1',3'-benzene-di-sulfonate; and
di(3-carboxy-5-chlorophenyl)-1',3'-benzene-di-sulfonate.

EXAMPLE 2

A 300 ml. autoclave was charged with a mixture of di-4-tolyl 1',3'-benzene di-sulfonate (20.9 g., 0.05 mole), MEK (6.0 g., 0.83 mole), cobalt acetate tetrahydrate (2.5 g., 0.01 mole) and acetic acid (100 ml.). The solution was stirred rapidly and maintained at a temperature of about 125° C. while pure oxygen was passed in at a rate so as to sustain the oxygen pressure at 250 p.s.i. After the oxygen absorption ceased, the mixture was cooled and removed from the autoclave. The product, a white ppt., was filtered hot, washed with cold acetic acid, cold water, and dried in an oven at 109° C. The yield of di(4-carboxyphenyl)-1',3'-benzene-di - sulfonate was 16.2 g., (68% of theoretical) M.P. 319–22.

Neutralization equivalent:
 Calc. _____ 245
 Found _____ 239

The N.M.R. spectrum of the product supported the proposed structure; the dibasic acid was converted to its corresponding di-methyl ester, M.P. 130–33° C.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What I claim is:

1. Aromatic dicarboxylic acids having the structural formula:

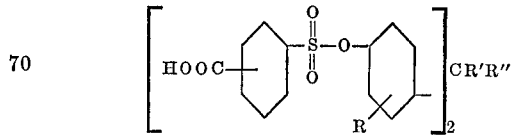

wherein R is hydrogen, t-butyl, halogen, nitro, or methoxy and R' and R'' are alkyl of 1 to 3 carbon atoms.

2. 4,4' - isopropylidene-diphenyl 4'',4'''-dicarboxybenzenesulfonate.

References Cited

UNITED STATES PATENTS 2,615,913   10/1952   Widmer _____ 260—456

BERNARD HELFIN, Primary Examiner

L. DE CRESCENTE, Assistant Examiner

U.S. Cl. X.R.

260—79

PO-1050
(5/69)

UNITED STATES PATENT OFFICE
CERTIFICATE OF CORRECTION

Patent No. 3,518,294      Dated June 30, 1970

Inventor(s) Burton M. Rein

It is certified that error appears in the above-identified patent and that said Letters Patent are hereby corrected as shown below:

Column 3, line 68, should read -- di(3-carboxyphenyl)-1',3'-benzene-di-sulfonate -- not "di(3-carboxypheny)-1',3'-benzene-disulfate"

Column 3, line 70, should read -- di(3-bromo-4-carboxyphenyl)-1',3'-benzene-di-sulfonate -- not "di(3-carboxyphenyl)-1',3'-benzene-disulfonate"

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents